Oct. 14, 1941.     W. H. WINKELMAN     2,259,332
FRUIT SPLITTER
Filed June 5, 1940     2 Sheets-Sheet 2
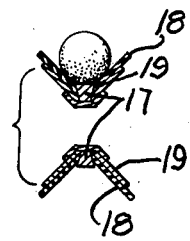
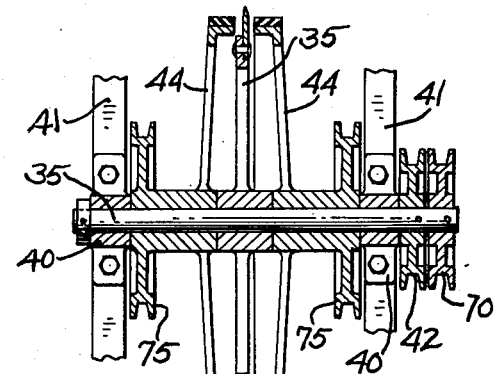
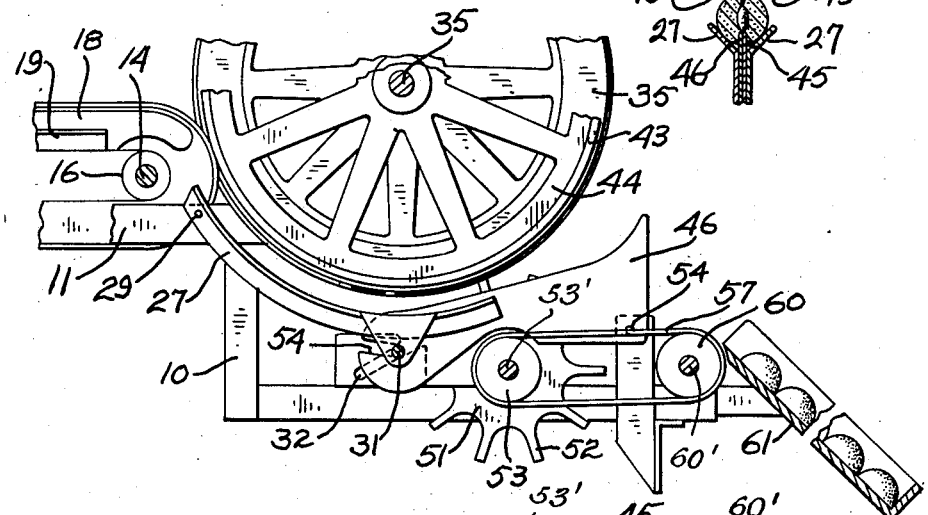
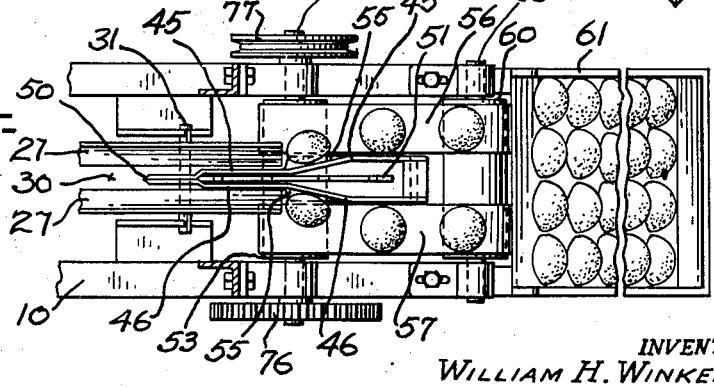
INVENTOR.
WILLIAM H. WINKELMAN
BY Lippincott & Metcalf
ATTORNEYS.

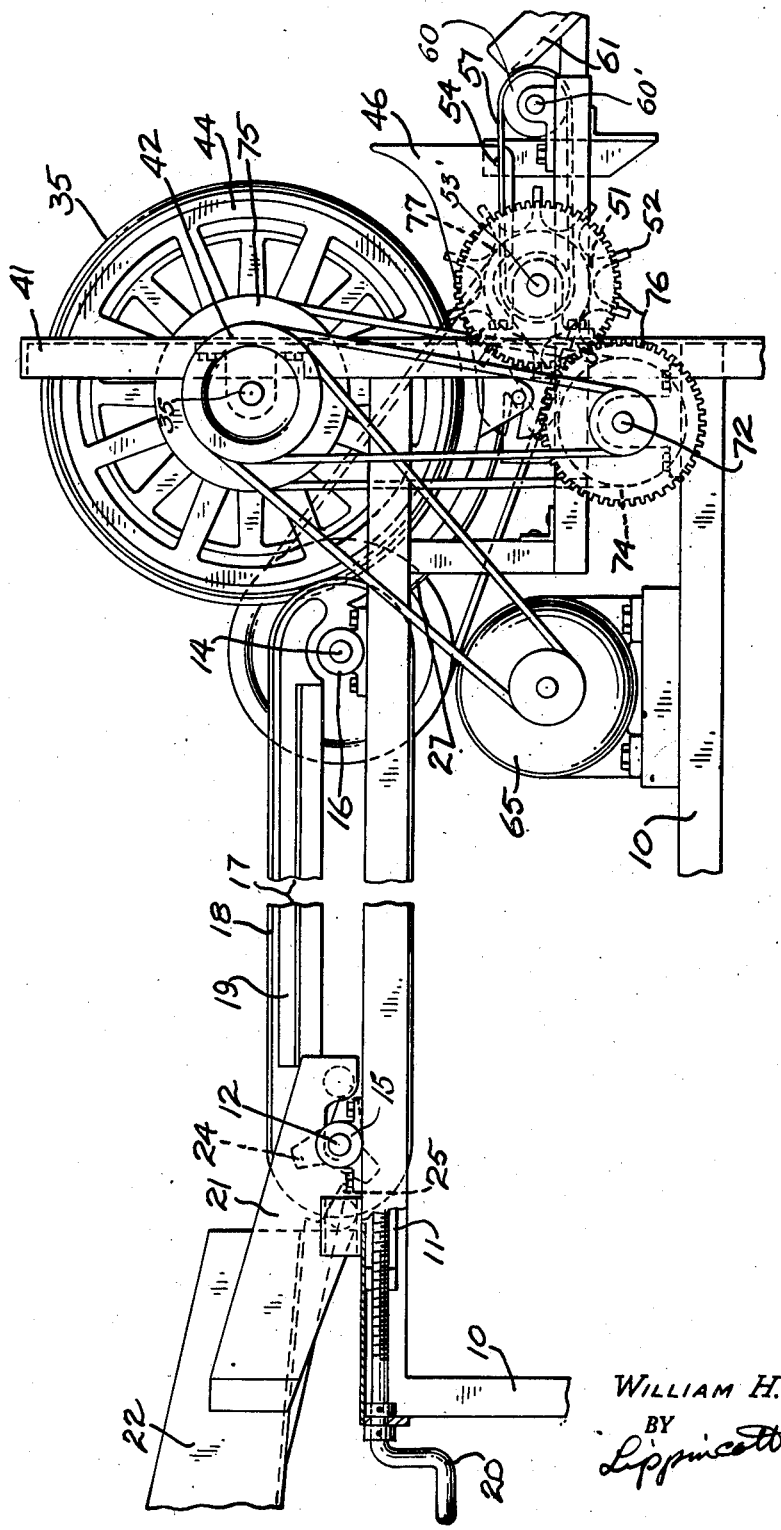
Oct. 14, 1941.   W. H. WINKELMAN   2,259,332
FRUIT SPLITTER
Filed June 5, 1940   2 Sheets-Sheet 1
Fig-1-
INVENTOR.
WILLIAM H. WINKELMAN
BY
ATTORNEYS.

UNITED STATES PATENT OFFICE 2,259,332

FRUIT SPLITTER

William H. Winkelman, Hemet, Calif.

Application June 5, 1940, Serial No. 338,893

6 Claims. (Cl. 146—28)

My invention relates to fruit splitters, and more particularly to a device which will automatically split and remove pits from stone fruit, such as peaches and apricots.

Among the objects of my invention are: To provide a means and method of splitting, pitting, and delivering the halves of peaches or apricots; to provide an automatic machine for splitting, pitting, and delivering the separate halves of fruit, such as peaches and apricots; to provide a fruit splitter and pitter; and to provide a completely automatic device for preparing fruit, such as peaches and apricots, for drying.

In the drawings:

Fig. 1 is a longitudinal view, partly in section and partly in elevation, showing one preferred form of my device.

Fig. 2 is a cross-sectional view of the delivery conveyor.

Fig. 3 is a cross-sectional view of the splitting mechanism.

Fig. 4 is a detailed view of the splitting chute and separation blades.

Fig. 5 is a top view of the splitting chute, separation blades, and trayer belts.

My invention may be more fully understood by direct reference to the drawings.

In Fig. 1, a frame 10 is provided on which is mounted a sub-frame 11 carrying spaced axles 12 and 14. Axles 12 and 14 carry conveyor pulleys 15 and 16, respectively, on which is mounted a V-belt 17 having flared sides 18 backed by stationary guard 19. The sub-frame 11 is moved horizontally with respect to frame 10 by crank and screw 20. At one end of the frame 10 is a stationary inlet chute 21 fed with fruit from a hopper 22 which is oscillated by means of cam 24 mounted on axle 12. Inlet chute 21 has a pointed end 25 extending between the sides 18 of the V-belt. The other end of the V-belt passes around pulley 16 and delivers fruit on the belt into a curved, divided splitting chute 27, this chute being pivoted by pin 29 to the end of sub-frame 11 as shown in Fig. 4. Divided chute 27 has a generally semi-circular section and is provided with an open central space 30, as shown in Fig. 5. The other end of the divided chute 27 is mounted on a pin 31 sliding in angular slot 32 on bracket 34 mounted on frame 10, so that as sub-frame 11 is moved horizontally, both ends of chute 27 move vertically maintaining the general angular position of the chute.

Positioned above chute 27 is a splitting wheel and knife 35 mounted on splitting knife axle 36, as shown in Fig. 3. Splitting knife axle 36 is journaled in bearings 40 mounted on frame uprights 41 on each side thereof, and the splitting knife axle 36 is provided with a driven pulley 42 adjacent one bearing 40. Mounted to revolve on splitting knife axle 36, on each side of splitting wheel and knife 35, are fruit turning wheels 44 provided on the periphery thereof with a resilient deformable layer 43, soft sponge rubber being preferred. The diameter of the splitting knife is greater than the diameter of either turning wheel, so that the splitting knife extends beyond the outer periphery of the resilient layer 43. The splitting wheel assembly, comprising the two fruit turning wheels with the splitting knife between them, is so positioned on uprights 41 that the circularity of the splitting chute 27 is substantially concentric therewith, the spacing being such that knife 35 will enter the fruit to cut and split the fruit while the soft material 43 is forcing the fruit against the splitting chute 27 and rotating the fruit downwardly along the chute.

Means for separating the fruit halves is provided, comprising two separating blades 45 and 46; one end of these blades being positioned in space 30 between the two portions of the splitting chute, these two ends, in this position, being in contact, vertical, and provided with cooperating bevels 50 to form a sharpened edge presented to the rotating, cut fruit. As the blades 45 and 46 extend toward the rear of the machine, they become spaced to allow the rotation therebetween of a vertical pitting wheel 51 having radial pitting extensions 52 thereon. This wheel is mounted on cross pulley 53. The forward ends of both blades 45 and 46 are provided with slots 54 engaging pin 32, so that as the splitting chute 27 is moved vertically the separation blades will follow. The rear ends of the separation blades are each rotatably mounted on blade mounting pin 54 attached to frame 10.

To the rear of the point where the separation blades 45 and 46 are spaced to allow the passage of pitting wheel 51, they again diverge with an outward flare 55 on the lower portion of each blade to discharge the fruit halves onto a pair of spaced, parallel and horizontal trayer belts 56 and 57, these belts being mounted at one end on cross pulleys 53 and at the other end on rear cross pulleys 60. The discharge ends of belts 56 and 57 pass around rear cross pulleys 60 to discharge fruit onto an inclined receiving tray 61. Cross pulleys 53 are mounted on front cross shaft 53' and rear cross pulleys 60 are mounted on rear cross pulley shaft 60'.

Power is supplied to the device from an electric motor 65 mounted on frame 1, which drives cutting wheel shaft pulley 42 directly by belt; cutting wheel shaft 36 is also provided with a driving pulley 70 on which a belt may be placed to drive a lower and intermediate shaft 72. Intermediate shaft 72 is provided with pulleys 74 which drive pulleys 75, turning fruit turning wheels 44. Cross pulley 53, carrying the pitting wheel, is rotated from the intermediate shaft 72 by gears 76, and cross pulley 73 is provided with a pulley 77 which drives delivery belt 17.

Having described the structure of my device, I will now describe the operation.

Whole fruit, such as peaches or apricots, is placed in hopper 21 and passes by gravity into delivery chute 22 which is continually agitated by cam 24, thus delivering the fruit onto the belt 17, as shown in Fig. 2, in sequence. Fruit is carried along conveyor belt 17 and dropped into splitting chute 27, the lower portion of the fruit bearing on the two halves of this chute; the upper portion of the fruit contacting the resilient material 43 on the turning wheels 44. Thus, the fruit is rolled downwardly in chute 27. As it is being rolled downwardly, the rotating splitting knife 45 cuts into the fruit to make an annular cut around the pit. I prefer to rotate the splitting knife 35 about ten times faster than the rotation of the turning wheels 44 to that by the time fruit reaches the separation blades 45 and 46, it will be completely split up to the pit by the knife 45. All adjustment for size of fruit is made by moving subframe 1 horizontally, this movement adjusting the distance from turning wheels 44 to chute 27.

An attendant watches the fruit on conveyor belt 17 and turns the fruit, if necessary with the seam toward the cutting knife, in order that the fruit be split through the seam plane.

As the cut fruit approaches the bevels 50 on the separating blades, the bottoms of the fruit halves first start to separate, and it will be noticed that the top contour of the separation blades rises as the fruit progresses, thus the separation continues. However, as the fruit halves reach the place where the ends of the pitting wheel blades 52 pass between them, the fruit halves have been separated sufficiently for the pit to be picked up between two of the pitting blades 52 and forced rearwardly along with the fruit halves. Then, as the separation blades become still further spaced adjacent flares 55, the fruit has separated sufficiently for the pit to be taken out of the fruit between the fruit halves by the pitting blades 52 and discharged between the separation blades. The two halves then slide laterally and downwardly on flares 55 and the fruit will be deposited on and picked up by belts 56 and 57 with their convex surfaces uppermost, and with the cut surfaces flat on the coplanar trayer belts 56 and 57. These cut halves, freed from the pits, are then carried by the trayer belts and then discharged by gravity onto the inclined tray 61, slide down by gravity, and pile up, edge to edge thereon, as shown in Figs. 4 and 5. As each inclined tray becomes full, a new one may be substituted, and then a drying tray, not shown, is placed over the fruit on inclined tray 61 and tray 61 completely inverted so that the fruit on the drying tray will rest thereon with the convex surface of the fruit uppermost. This position is the desired position for sulphuring and drying, to which processes the fruit may then be subjected.

It will thus be seen that my machine is completely automatic, taking bulk fruit, splitting it, removing the pits therefrom, and delivering it in a predetermined aspect to the drying trays. The only manual operations that are necessary are the loading of the device, the checking of the fruit on the delivery conveyor, the removal of the halves, and inversions of the halves onto the drying trays.

I claim:

1. Means for cutting fruit comprising a cutting wheel having a thin peripheral edge, a pair of fruit turning wheels of lesser diameter than said cutting wheel, one on each side of said cutting wheel, said cutting wheel rotating independently of said turning wheels, said wheels being coaxially mounted, and means for forcing a fruit simultaneously against all three wheels.

2. Apparatus in accordance with claim 1 wherein the peripheries of the fruit turning wheels are resilient and compressible.

3. Apparatus in accordance with claim 1 wherein means are provided to rotate the cutting wheel substantially ten times the speed of the turning wheels.

4. Apparatus in accordance with claim 1 wherein the means for forcing the fruit against the wheels is an arcuate chute concentrically positioned below the peripheries of said wheels.

5. Apparatus in accordance with claim 1 wherein the means for forcing the fruit against the wheels is an arcuate chute concentrically positioned below the peripheries of said wheels and extending upwardly on one side of said wheels, the rotation of said fruit turning wheels being in a direction to progress fruit from the upper end of said chute to the lower end thereof.

6. Apparatus in accordance with claim 1 wherein the means for forcing the fruit against the wheels is an arcuate chute concentrically positioned below the peripheries of said wheels and means for adjusting the distance between said chute and the peripheries of said wheels.

WILLIAM H. WINKELMAN.